(12) United States Patent
Müller et al.

(10) Patent No.: US 7,823,602 B2
(45) Date of Patent: Nov. 2, 2010

(54) HYDRAULIC SYSTEM HAVING AT LEAST ONE HYDRAULIC VALVE FOR ACTUATING A COMPONENT

(75) Inventors: Eric Müller, Kaiserslautern (DE); Reinhard Stehr, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 482 days.

(21) Appl. No.: 11/303,856

(22) Filed: Dec. 17, 2005

(65) Prior Publication Data
US 2006/0157660 A1    Jul. 20, 2006

(30) Foreign Application Priority Data
Dec. 18, 2004    (DE) .................... 10 2004 060 986

(51) Int. Cl.
*F15B 20/00* (2006.01)
(52) U.S. Cl. .............. 137/596.16; 137/102; 137/596.17
(58) Field of Classification Search ................. 137/102, 137/596, 596.17, 596.16
See application file for complete search history.

(56) References Cited

U.S. PATENT DOCUMENTS

| | | | | |
|---|---|---|---|---|
| 726,841 A * | 5/1903 | Ball, Jr. ....................... | 137/102 |
| 3,304,842 A * | 2/1967 | Shafer .................... | 137/596.16 |
| 4,011,888 A * | 3/1977 | Whelchel et al. ........ | 137/596.16 |
| 4,304,258 A * | 12/1981 | Mitchell ................. | 137/596.17 |
| 4,337,798 A * | 7/1982 | Zettergren ............. | 137/596.17 |
| 4,527,592 A * | 7/1985 | Dotti et al. ............. | 137/625.61 |
| 4,649,951 A * | 3/1987 | Tardy ........................ | 137/596 |
| 4,706,932 A * | 11/1987 | Yoshida et al. ......... | 137/596.16 |
| 4,844,119 A * | 7/1989 | Martinic ................. | 137/596.17 |
| 5,051,631 A * | 9/1991 | Anderson .............. | 137/625.61 |
| 5,186,093 A * | 2/1993 | Kervagoret ............ | 137/596.17 |
| 5,191,827 A * | 3/1993 | Kervagoret ............ | 137/596.17 |
| 5,234,030 A * | 8/1993 | Kervagoret et al. .... | 137/596.17 |
| 5,577,815 A * | 11/1996 | Hashida ................. | 137/596.17 |
| 5,979,862 A * | 11/1999 | Wolfges ................. | 137/596.16 |
| 6,109,300 A | 8/2000 | Najmolhoda ........... | 137/596.16 |
| 6,328,065 B1 | 12/2001 | Schmid et al. ......... | 137/596.17 |
| 6,571,828 B2 * | 6/2003 | Harms et al. ........... | 137/625.61 |
| 6,866,063 B2 * | 3/2005 | Avila ...................... | 137/596.17 |

FOREIGN PATENT DOCUMENTS

DE    197 33 660 A1    2/1999
EP    1 329 785 A2    7/2003

* cited by examiner

*Primary Examiner*—Stephen Hepperle
*Assistant Examiner*—Craig Price
(74) *Attorney, Agent, or Firm*—Alfred J. Mangels

(57) ABSTRACT

A hydraulic system having at least one hydraulic valve for actuating a component, wherein a control pressure acting on the hydraulic valve can be activated through a supply pressure of a pilot circuit having at least one actuator. At least one pressure reduction apparatus is connected in series with the actuator.

14 Claims, 6 Drawing Sheets

HYDRAULIC SYSTEM HAVING AT LEAST ONE HYDRAULIC VALVE FOR ACTUATING A COMPONENT

BACKGROUND OF THE INVENTION

1. Field of the Invention

The present invention concerns a hydraulic system having at least one hydraulic valve for actuating a component, where a control pressure acting on the hydraulic valve can be activated through a supply pressure of a pilot circuit having at least one actuator.

2. Description of the Related Art

Such a hydraulic system is sufficiently known from vehicle technology, for example for actuating transmission components. The hydraulic circuit, which is usually coupled with a pilot circuit, as a rule has one or more proportional and/or on/off valves as actuators, which to set a control pressure at the hydraulic cylinder produce a leakage which is carried off to a connected tank. The leakage produced by the respective actuators, which are generally in the form of electromagnetic valves, is dependent on a pilot orifice used in the pilot circuit and on the flow conditions in the actuators.

It has been found that the leakage produced increases to a not insignificant volume, in particular when several electromagnetic valves are used. Hence, among other things, a correspondingly larger capacity pump is necessary to return the leakage flow.

Accordingly, an object of the present invention is to provide a hydraulic system of the type named at the beginning, wherein the leakage is reduced without diminishing the dynamics of the hydraulic system.

SUMMARY OF THE INVENTION

That object is achieved by a hydraulic system having at least one hydraulic valve for actuating a component, such as, for example, a transmission component or the like, where a control pressure acting on the hydraulic valve can be activated through a supply pressure of a pilot circuit having at least one actuator. In accordance with the invention, at least one pressure reduction apparatus can be connected in series with the actuator.

Accordingly, by connecting a pressure reduction device in series, the maximum possible leakage volume that is produced by the actuator is substantially reduced overall. That is achieved, for example, by significantly reducing the pilot pressure behind the pilot orifice when the electromagnetic valve is completely opened. For example, at a pilot pressure of 5 bar and a pilot orifice of 0.8 mm, with the known hydraulic system a maximum leakage of approximately 0.75 l/min per actuator is produced. The pressure reduction apparatus provided in accordance with the invention, which is provided in series with the actuator, is able to reduce the differential pressure. Thus it is possible under the conditions named above to reduce the maximum leakage to approximately 0.34 l/min per actuator in the hydraulic system in accordance with the invention.

In the context of an advantageous refinement of the present invention, provision can be made for the pressure reduction device to be designed so that a differential pressure between the supply pressure of the pilot circuit and the control pressure is realizable. Since the maximum leakage flow occurs with the actuator completely opened, i.e., with minimum control pressure, the reduction of the resulting differential pressure between the supply pressure and the control pressure in accordance with the present invention is particularly effective.

If, in accordance with a possible embodiment of the present invention, an electromagnetically operated proportional valve is provided as the actuator, a pressure limiting valve that is connected in series with the proportional valve can be used with particular advantage as the pressure reduction apparatus. Hence, the pressure limiting valve is inserted between a pilot orifice of the pilot circuit and the proportional valve. In that way, the constant supply pressure in series with the pilot orifice can be reduced by the functioning of the pressure limiting valve after the pilot orifice, in such a way that the maximum leakage flow with the proportional valve fully opened is substantially reduced, since the resulting differential pressure at that operating point is lowered by the pressure limiting valve.

In accordance with a further embodiment of the present invention, the functioning of the pressure reducing valve can be realized by a spring-loaded control piston having one area subjected to the supply pressure and one area subjected to the control pressure. Hence, with the pressure limiting valve closed, i.e., when the control piston is pressed against the corresponding sealing seat in the proportional valve, the first area of the control piston can be subjected to the supply pressure, so that the control piston is able to lift from the sealing area, enabling the hydraulic medium to flow into the proportional valve. With the proportional valve fully opened, i.e. with a control pressure approximately equal to zero, only the first area is subjected to the supply pressure after the pilot orifice, so that the resulting differential pressure in the proportional valve is reduced in an advantageous way because of the spring force acting on the control piston. Hence the leakage is also substantially reduced.

In a proportional valve that is closing, the second area of the control piston is subjected to the resulting control pressure, while the pressure is reduced by the pressure limiting valve depending on the ratio of the first area and the second area. In that way, along with the advantageous reduction of the leakage, the desired dynamics of the hydraulic system in accordance with the invention are also preserved.

In another possible embodiment of the present invention, an electromagnetically operated on/off valve can be employed as the actuator. In contrast to a proportional valve, the on/off valve is able to assume only two positions. To advantageously simplify the hydraulic system in accordance with the present invention, in that case the spring-loaded control piston of the hydraulic valve can be provided as a pressure reduction apparatus to produce predetermined hydraulic connections. That has the advantage that the control piston of the hydraulic valve fulfills on the one hand the function of pressure reduction and on the other hand the function of the hydraulic valve to switch at least one control conduit of the hydraulic cylinder. In that way, the design configuration of the hydraulic system in accordance with the invention is substantially simplified in that embodiment.

A further embodiment of the present invention can provide in that embodiment that the realization of the pressure reduction of the control piston of the hydraulic valve has at least a first area after the pilot orifice that is subjected to the pilot pressure, and a second area subjected to the pressure in the on/off valve. Hence in that embodiment also, two areas subjected to different pressures are provided.

With the on/off valve open, only the first area is subjected to the supply pressure after the pilot orifice, so that the resulting differential pressure in the on/off valve is reduced because of the spring force acting on the control piston. Hence, in that embodiment as well, the maximum leakage flow with the on/off valve opened is substantially reduced. The spring force, which acts on the control piston, can be chosen so that a pressure below the maximum pressure in the on/off valve appears after the pilot orifice. That means that the control piston is suspended above its sealing seat, so that too small pressure differences here are realized after the pilot orifice.

In the case of a closing or closed on/off valve, the second area of the control piston is subjected to the resulting pressure in the on/off valve, so that the control piston moves against the spring force acting on the control piston. That motion can continue until it reaches a stop. As soon as the control piston has lifted off its sealing seat, the first area is also subjected to the resulting pressure in the on/off valve, so that the control piston can be moved to an end position.

In accordance with an advantageous embodiment of the present invention, the control piston has cylindrical sections for switching at least one control conduit of the hydraulic cylinder, or to apply the control pressure to at least one control conduit. Those sections can open and close certain control conduits depending on the movement of the control piston, so that in that way predetermined components are actuatable by the hydraulic cylinder.

For example, a first cylindrical section and a second cylindrical section can be provided as sections, with a middle section having a reduced outside diameter being positioned between the first section and the second section. The transitional areas between the sections and the middle section can have a rounded shape. Other design configurations of the hydraulic valve are also possible in the hydraulic system in accordance with the invention.

Preferably, the proposed hydraulic system in accordance with the invention can be used in twin clutch transmissions, CVT transmission systems, or the like, to control certain transmission components or to control subsections of the transmission systems.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
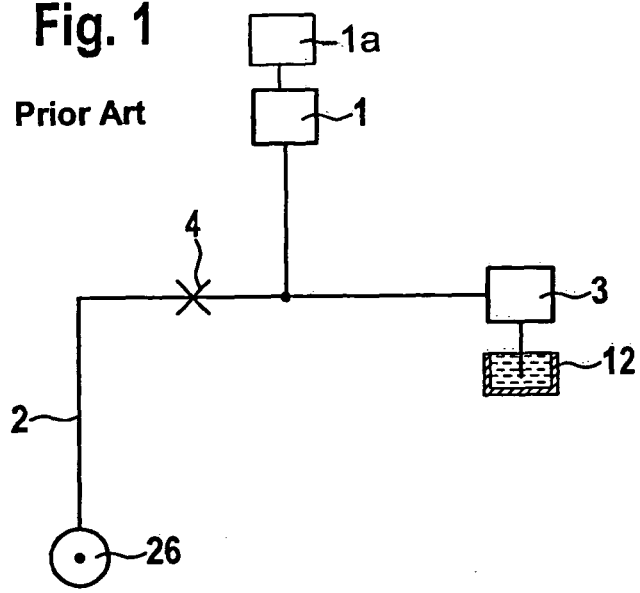
FIG. 1 is a schematic view of a known hydraulic system.

FIG. 1 shows a schematic view of the known hydraulic system, with a hydraulic valve 1 for actuating a component 1a. The hydraulic valve 1 is actuated through a pilot circuit 2, with an electromagnetic valve designed as an actuator 3. The pilot circuit 2 is supplied by a supply source 26 with a hydraulic fluid under a supply pressure. In addition, the pilot circuit includes a pilot orifice 4. The electromagnetic valve 3 is coupled with a tank 12 to carry off the leakage flow. With the electromagnetic valve 3, a predetermined control pressure can be applied to the hydraulic valve 1 through the supply pressure in the pilot circuit 2.

Figure 2:
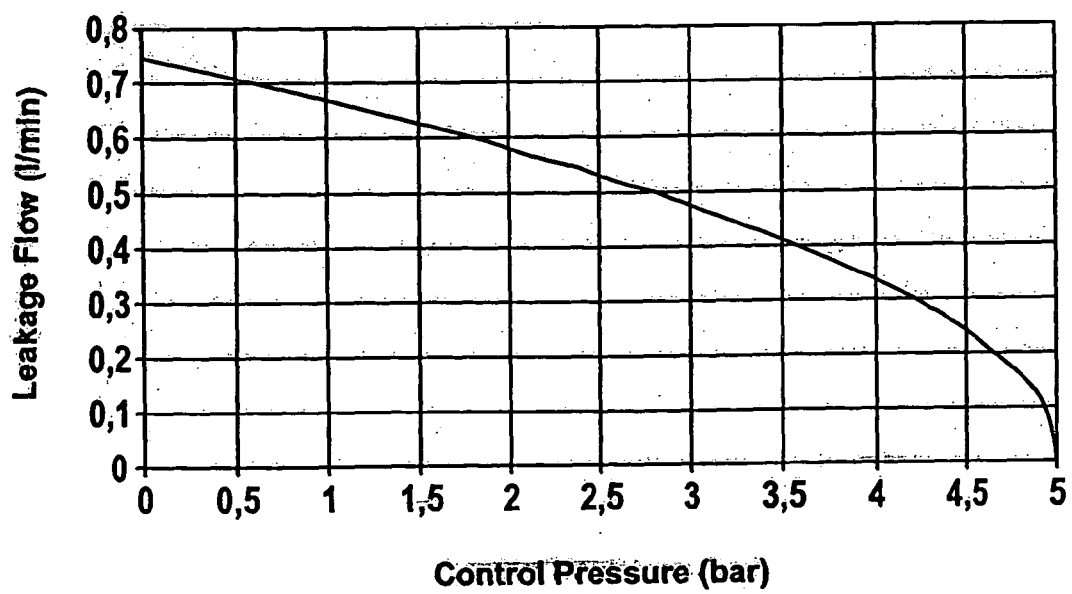
FIG. 2 is a graph showing leakage flow as a function of control pressure at the hydraulic valve in the known hydraulic system.

FIG. 2 shows the leakage flow as a function of the control pressure in the known hydraulic system in accordance with FIG. 1. It is clear from the shape of the curve that the maximum leakage flow is produced with the electromagnetic valve completely opened and a resulting control pressure of 0 bar. The leakage flow that occurs is carried off through the electromagnetic valve 3 into the connected tank 12.

Figure 3:
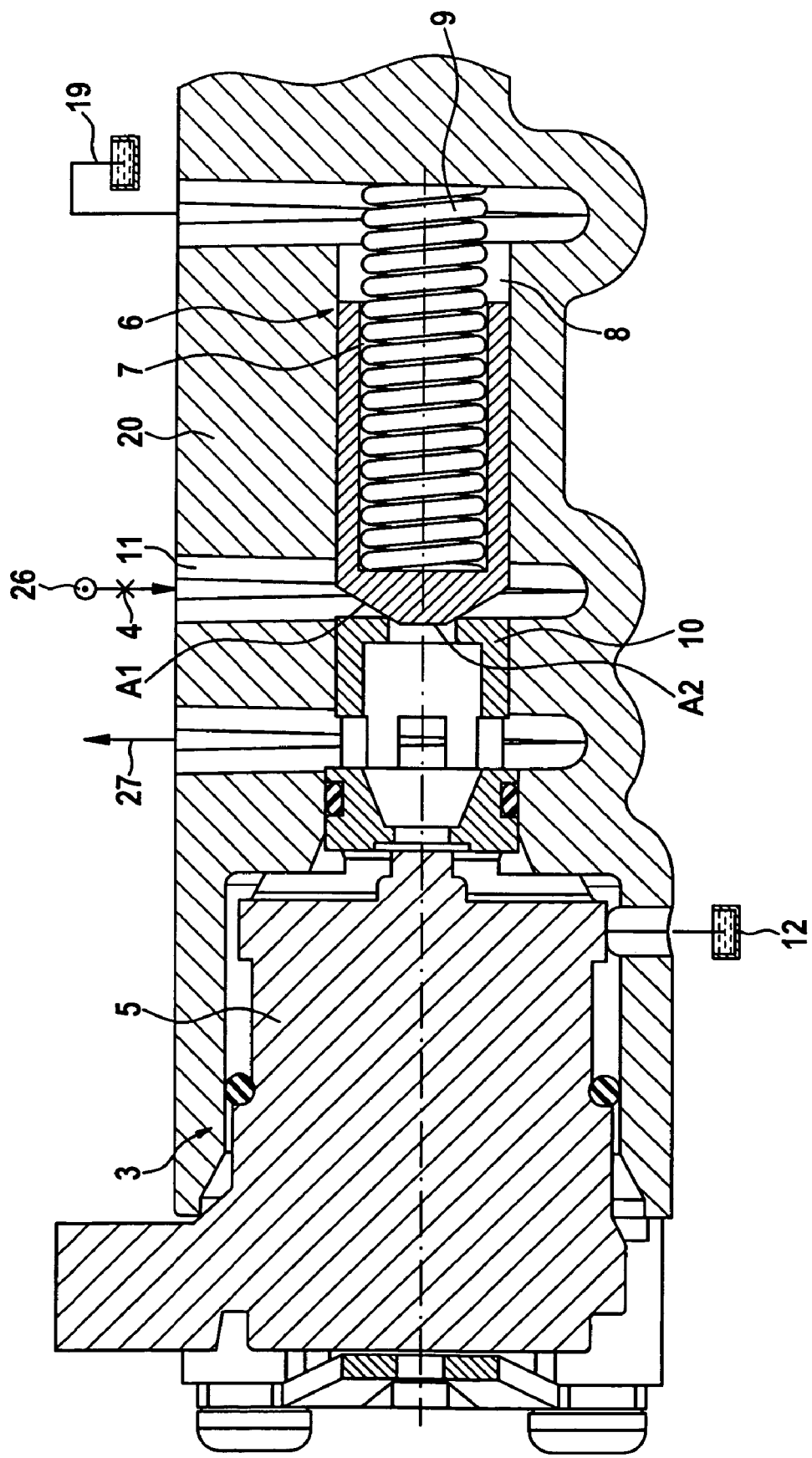
FIG. 3 is a fragmentary cross-sectional view of one possible embodiment of a hydraulic system in accordance with the invention.

FIG. 3 shows a fragmentary cross-sectional view of a first embodiment of a hydraulic system in accordance with the invention. In that first embodiment, an electromagnetically actuated proportional valve 5 is used as the actuator 3; the structural arrangement of the proportional valve 5 is known and is not further described.

A pressure reducing device is connected in series with the proportional valve 5, so that a differential pressure between the supply pressure of the pilot circuit 2 and the control pressure in the proportional valve 5 is lessened in order to reduce the leakage flow in the hydraulic system in accordance with the invention. The proportional valve 5 is connected to a tank 12, into which the leakage flow can be carried off. Furthermore, the proportional valve 5 is connected through a control pressure conduit, indicated with an arrow 27 in FIG. 3, to the hydraulic valve 1, which is not shown in further detail.

In the first embodiment of the present invention a pressure limiting valve 6 is used as a pressure reducing device, which is connected between the pilot orifice 4 and the proportional valve 5. The pressure limiting valve 6 has a control piston 7; one end of the control piston 7 that faces the proportional valve 5 cooperates with a corresponding valve seat 10. The control piston 7 is movably received in a bore 8 in valve housing 20 and is pressed against valve seat 10 of the pressure limiting valve 6 by a spring element 9.

The end of the proportional valve 5 that faces the control piston 7 is movable in a conduit 11 that runs transversely to the bore 8, which conduit is subjected to the supply pressure after the pilot orifice 4. The end of the control piston 7 exhibits a first area $A_1$, which is subjected to the supply pressure downstream of the pilot orifice 4. Furthermore, at the end of the control piston 7 there is a second area $A_2$, which is subjected to the control pressure that is set by the proportional valve 5. The first area is an annular area that is inclined relative to a control piston longitudinal axis and surrounds the second area at a common end face of the control piston, The second area is substantially perpendicular to the control piston longitudinal axis. The size of the first area $A_1$ is found from the following equation:

$$A_1 = (D_1^2 - D_2^2) \cdot \frac{\pi}{4}$$

The size of the second area $A_2$ is found from the following equation:

$$A_2 = D_2^2 \cdot \frac{\pi}{4}$$

where $D_1$ is the outer diameter at the face of the control piston 7, $D_2$ is the inner diameter at the face of the control piston 7.

The spring force of the spring element 9 acting on the control piston 7 is set so that the force corresponds to a pressure of about 4 bar, which acts on the first area $A_1$ of the control piston 7 of the pressure limiting valve 6. In that way, a pressure of 4 bar appears at the pressure limiting valve 6 when the proportional valve 5 is completely opened. At a supply pressure of for example 5 bar upstream of the pilot orifice 4, behind the pilot orifice 4 there is a differential pressure of one bar. That corresponds to the differential pressure, so that the leakage flow is reduced to about 0.34 liters per minute. In the known hydraulic system, in contrast, under the same operating conditions a leakage flow of about 0.75 l/min occurs, so that in the hydraulic system in accordance with the invention the leakage flow has been reduced by about 0.4 l/min at that operating point.

Figure 6:
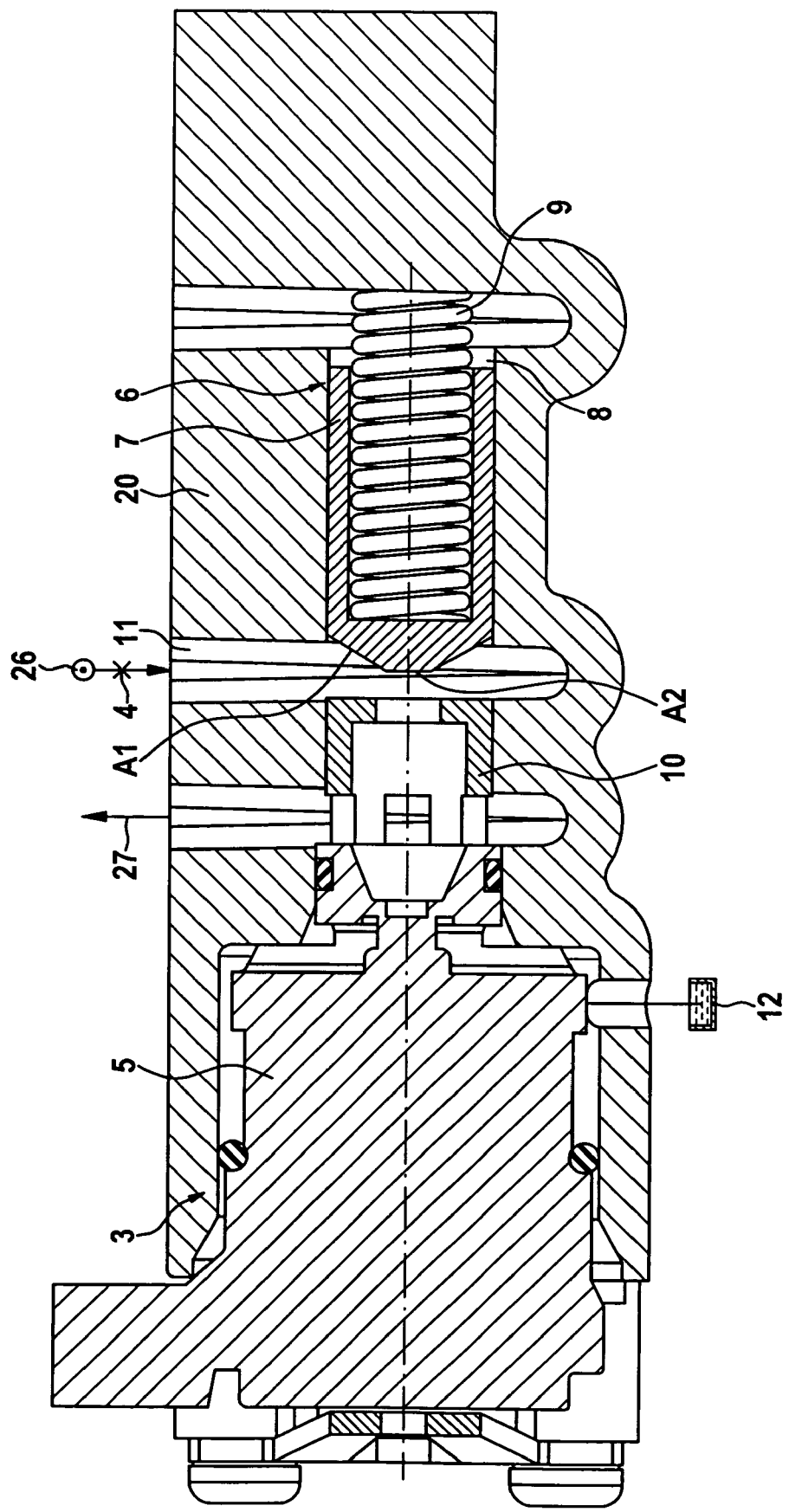
FIG. 6 is a fragmentary cross-sectional view of the FIG. 3 embodiment with a closed proportional valve and an open pressure limiting valve.

FIG. 6 shows another fragmentary cross-sectional view of the hydraulic system of FIG. 3 in accordance with the invention, in which the proportional valve 5 is closed and the pressure limiting valve 6 is completely open. At that operating point the maximum control pressure is reached, which corresponds in that case to the supply pressure. Since the proportional valve 5 is closed relative to the tank 12, at that operating point no leakage flow occurs. When the control piston 7 is moved away from the valve seat 10, an opening in valve seat 10 provides communication between the pilot orifice 4 and control pressure conduit 27.

If the proportional valve 5 is no longer completely open, the control pressures are above 0 bar, with the control pressure acting on the second area $A_2$ of the control piston 7 of the pressure limiting valve 6. As the control pressure rises, the control piston 7 is thus opened against the spring force of the spring element 9, until the pressure limiting valve 6 is completely open. That lowers the pressure in series with the pressure limiting valve, which is determined as a function of the ratio of first area $A_1$ to second area $A_2$.

Figure 4:
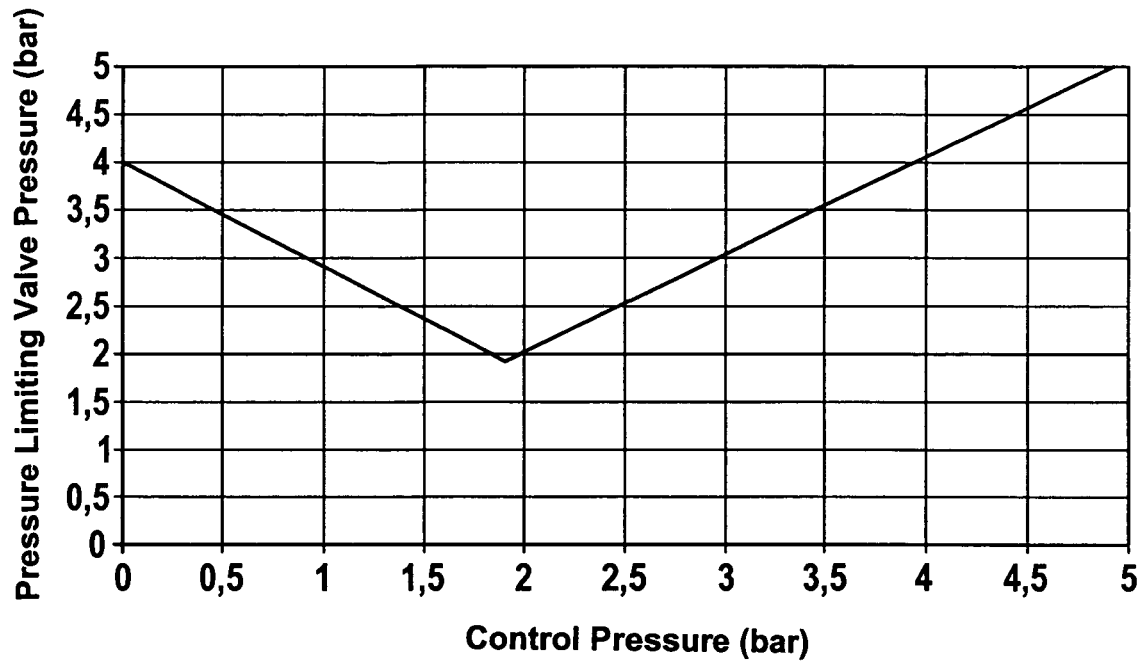
FIG. 4 is a graph showing the pressure in a pressure limiting valve as a function of the control pressure in the hydraulic system in accordance with the invention.

FIG. 4 shows as an example the pressure in the pressure limiting valve as a function of the control pressure in the hydraulic cylinder 1 in the system in accordance with the invention. The functioning of the pressure limiting valve can be explained on the basis of that graphic representation.

From the pressure curve it is possible to perceive the drop in pressure of the pressure limiting valve as a function of the control pressure, until the point at which the pressure of the pressure limiting valve corresponds to the set control pressure. At that point the pressure limiting valve 6 opens by the movement of the pressure piston 7 away from the valve seat 10. After that, the hydraulic system in accordance with the invention behaves like the known hydraulic system. Accordingly, in an advantageous manner, in the hydraulic system in accordance with the invention the maximum leakage flow is reduced and the desired dynamics of the hydraulic system are preserved.

Figure 5:
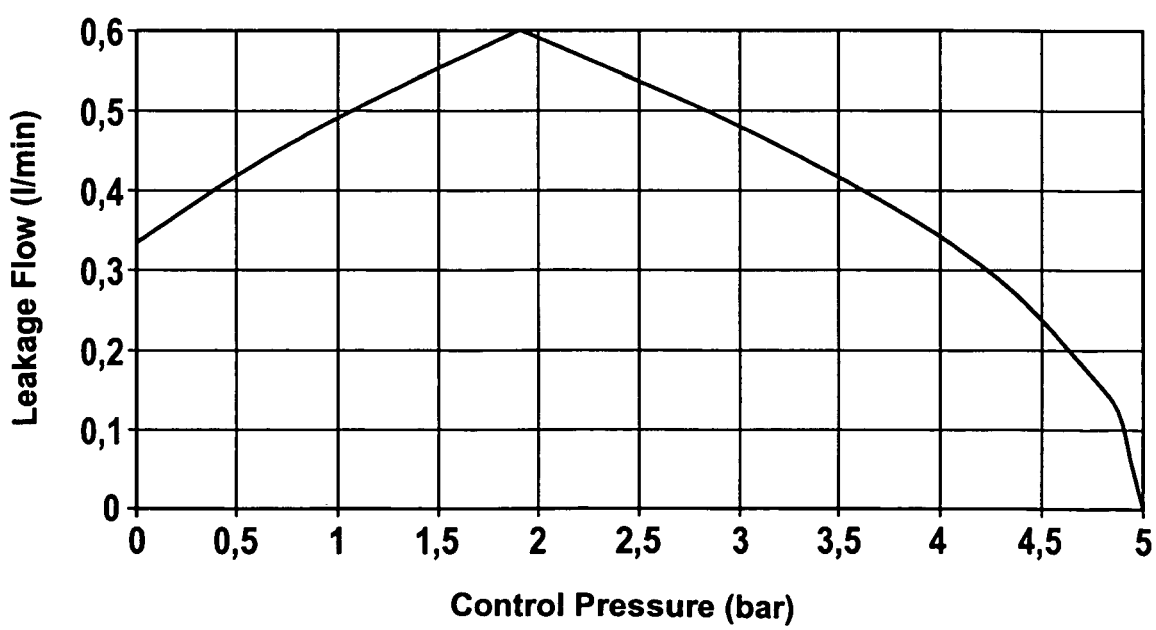
FIG. 5 is a graph showing leakage flow as a function of the control pressure in the hydraulic system in accordance with the invention.

FIG. 5 shows the leakage flow as a function of the control pressure in the hydraulic system in accordance with the invention. A comparison with the leakage flow in accordance with FIG. 2 in the known hydraulic system shows clearly that the leakage flow is reduced in the hydraulic system in accordance with the invention. A maximum improvement in regard to the leakage is attained at a control pressure of 0 bar.

The hydraulic system operating point shown in FIG. 3 is found again in the curves in FIGS. 4 and 5 ahead of the break, while the hydraulic system operating point shown in FIG. 6 corresponds to the course of the characteristic curves after the break.

The operation of the hydraulic system in which the proportional valve 5 is used as the actuator 3 can be described as follows.

The hydraulic system in accordance with the invention is subjected to a constant supply pressure of about 5 bar, which predetermines a control pressure for the hydraulic valve 1 through the conduit 11 via the pressure limiting valve 6, depending upon the position of the proportional valve 5. At a control pressure of 0 the proportional valve 5 is completely open. Because the control piston 7 of the pressure limiting valve 6 is pressed against the sealing seat 10 with the spring element 9, the supply pressure of 5 bar is reduced to 4 bar downstream of the pilot orifice 4, so that a differential pressure of one bar is present in the proportional valve 5. Accordingly, a maximum leakage flow of 0.34 liters per minute is produced at a control pressure of 0.

Figure 7:
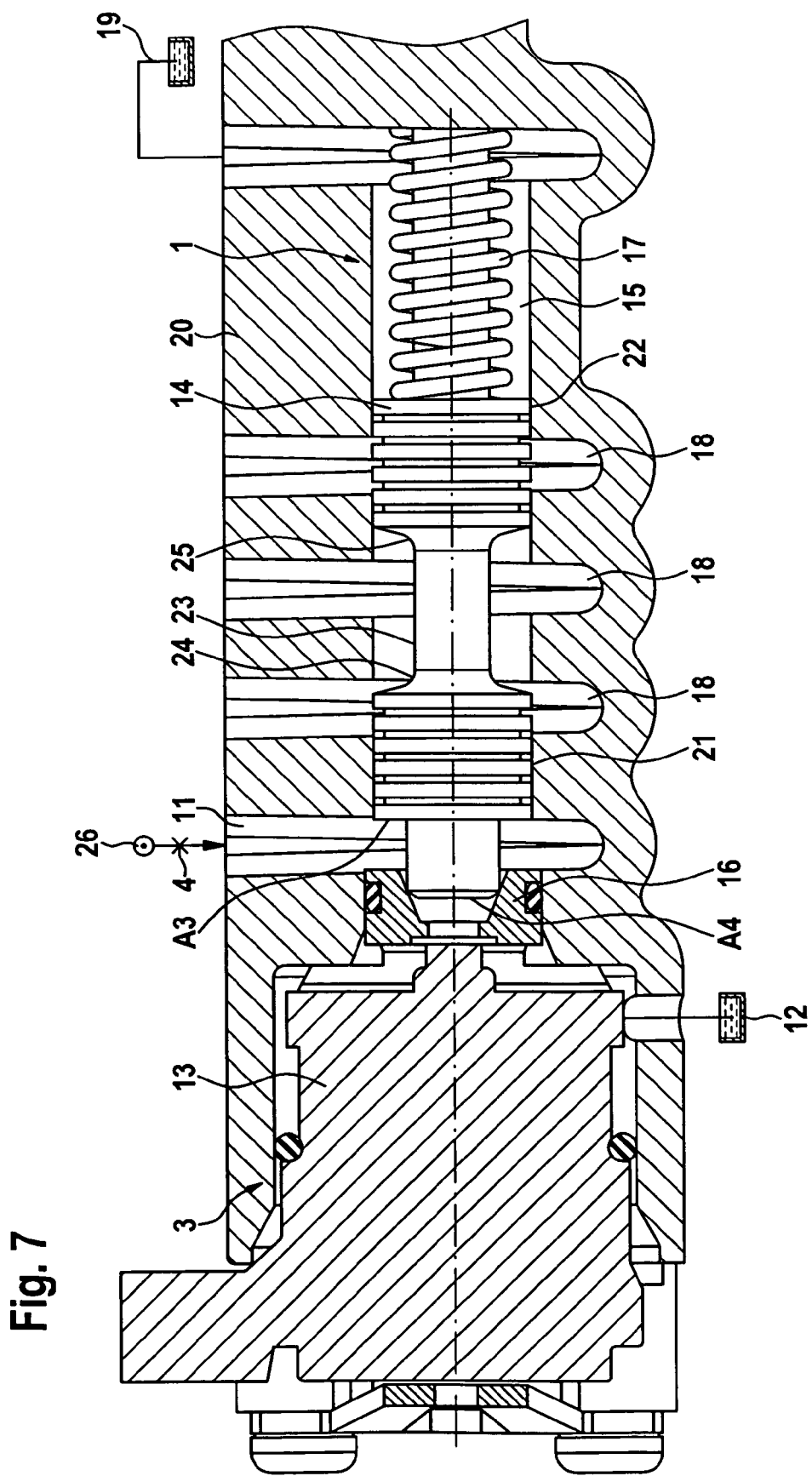
FIG. 7 is a fragmentary cross-sectional view of a second embodiment of a hydraulic system in accordance with the invention, with an on/off valve as the actuator.
Figure 8:
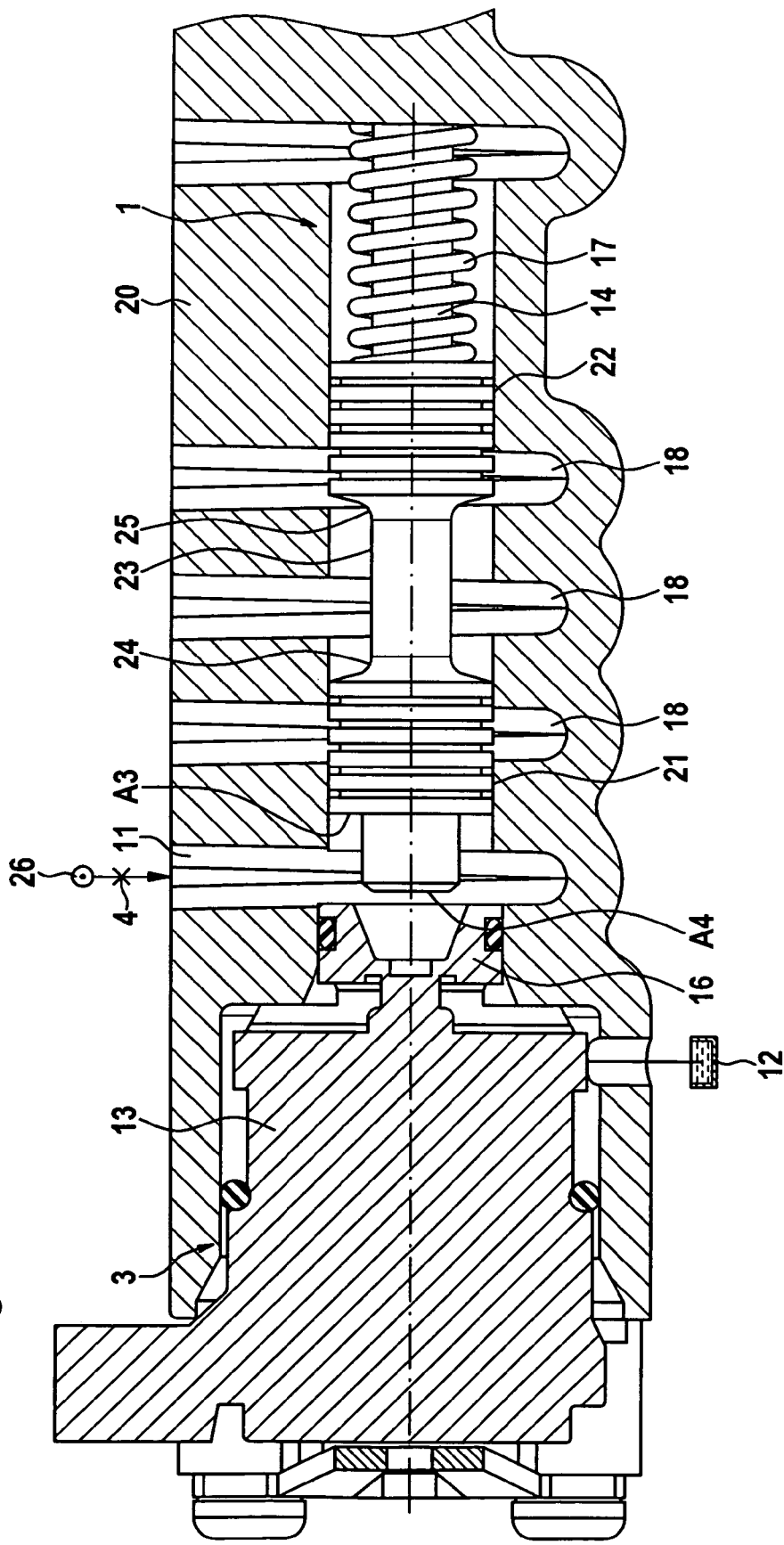
FIG. 8 is a fragmentary cross-sectional view of the second embodiment, with the on/off valve closed.

FIGS. 7 and 8 show a second embodiment of the present invention, in which the hydraulic system uses an on/off valve 13 as the actuator 3.

The on/off valve 13, which is also normally operated electromagnetically, is able to assume two switching positions. The hydraulic system is therefore able to be simplified further in that embodiment. That is achieved in that a spring-loaded control piston 14 of the hydraulic valve 1 for producing predetermined hydraulic connections is provided as pressure reduction device. The control piston 14 is guided in a bore 15 of the valve housing 15, while an end of the control piston 14 that faces the on/off valve 13 cooperates with a corresponding valve seat 16. The other end of the control piston 14, facing away from the on/off valve 13, is engaged by a spring element 17.

In the second embodiment of the present invention, the downstream hydraulic valve 1 takes on in addition the function of the pressure reduction device. The control piston 14 of the hydraulic valve 1 also has two areas $A_3$ and $A_4$ of different sizes in that embodiment. The first area $A_3$ of the control piston 14 is subjected to the supply pressure downstream of the pilot orifice 4. The second area $A_4$ of the control piston 14 is subjected to the pressure that exists in the on/off valve 13. FIG. 7 shows the operating point at which the on/off valve 13 is open. In contrast, FIG. 8 shows the operating point at which the on/off valve is closed.

The spring element 17, which presses the control piston 14 against the valve seat 16, is designed so that after the pilot orifice 4 a pressure lower than the maximum pressure in the on/off valve 13 occurs, so that the pressure piston 14 is partially suspended above the valve seat 16. Thus, here too a small pressure differential is realized after the pilot orifice, in order to keep the leakage flow as small as possible.

With the on/off valve 13 closed, as shown in FIG. 8, the end of the control piston 14 facing away from the on/off valve 13 is pressed against a stop, since the pressure in the on/off valve 13, which acts on the two control piston faces $A_3$ and $A_4$, is greater than the oppositely directed spring force of the spring element 17.

Furthermore, on the hydraulic valve 1 in the second embodiment of the present invention, parallel to the conduit 11, which is subjected to the supply pressure, there are additional control conduits 18, which can be opened and closed for example through several cylindrical sections 21, 22, 23 on the control piston 14 of the hydraulic valve 1, so that it is possible to realize actuation of a connected component with the hydraulic system in accordance with the invention. As can be seen from FIGS. 7 and 8, a first cylindrical section 21 and a second cylindrical section 22 are provided, with a middle section 23 having a reduced outer diameter being positioned between the first section 21 and the second section 22. The transition areas 24, 25 between the sections 21, 22 and the middle section 23 have a rounded shape in the exemplary embodiment shown.

For the second embodiment of the hydraulic system in accordance with the invention, in which the on/off valve 13 is provided as the actuator 3, the operation can be described as follows.

With the on/off valve 13 completely open, the first area $A_3$ of the control piston 14 of the hydraulic valve 1 is subjected to pressure against the spring force of the spring element 17, whereby a pressure lower than the maximum pressure in the on/off valve 13 arises downstream of the control orifice 4, and whereby the control piston 14 is suspended over the valve seat 16, so that here too the smallest possible differential pressure is present and the leakage flow is reduced. As soon is the on/off valve is closed, first the pressure prevailing in the on/off valve 13 comes to bear on the second area $A_4$ of the control piston 14 of the hydraulic valve 1, so that the control piston 14 moves to the right in the direction of its stop, against the spring force of the spring element 17. As soon as the hydraulic valve 1 is open, in addition to the second area $A_4$ the first area $A_3$ of the control piston 14 is also subjected to the pressure existing in the on/off valve 13, so that the resulting force, which acts on the control piston 14, is significantly greater than the spring force of the spring element 17. Consequently the end of the control piston 14 facing away from the on/off valve 13 is pressed against the stop, as is shown also in FIG. 8.

In both the first embodiment and the second embodiment of the hydraulic system in accordance with the invention, a vent 19 is provided.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. A hydraulic system having at least one hydraulic valve for actuating a component, said hydraulic system comprising: a pilot circuit having a supply pressure source and including an actuator, wherein the actuator is an electromagnetically operated proportional valve; a pilot orifice positioned in the pilot circuit between the supply pressure source and the component; wherein the at least one hydraulic valve for actuating the component is responsive to a control pressure that is controllable by the supply pressure of the pilot circuit; and a pressure reduction device connected in series with the pilot orifice, wherein the pressure reduction device is a pressure limiting valve that is connected between the pilot orifice of the pilot circuit and the proportional valve and is operative to reduce a resulting differential pressure between the supply pressure of the pilot circuit and the control pressure, wherein the pressure limiting valve includes a spring-loaded control piston movable relative to a valve seat and having at one end a first area ($A_1$) subjected to the supply pressure and a second area ($A_2$) subjected to the control pressure, and wherein the first and second areas of the control piston are each located at a common end face of the control piston and each of first and second areas faces the proportional valve.

2. A hydraulic system in accordance with claim 1, wherein when the proportional valve is completely open only the first area ($A_1$) of the control piston is subjected to the supply pressure downstream of the pilot orifice, so that a resulting differential pressure in the proportional valve is reduced because of the spring force acting on the control piston.

3. A hydraulic system in accordance with claim 1, wherein when the proportional valve is closing, the second area ($A_2$) of the control piston is first subjected to the control pressure, whereby a pressure upstream of the pressure limiting valve is reduced as a function of the ratio of the first area ($A_1$) to the second area ($A_2$).

4. A hydraulic system in accordance with claim 1, wherein the actuator is an electromagnetically operated on/off valve.

5. A hydraulic system in accordance with claim 4, wherein the spring-loaded control piston of the hydraulic valve is the pressure reduction device.

6. A hydraulic system in accordance with claim 5, wherein the control piston of the hydraulic valve has at least a first area ($A_3$) subjected to the supply pressure downstream of the pilot orifice, and a second area ($A_4$) is subjected to a pressure in the on/off valve in order to provide a desired pressure reduction.

7. A hydraulic system in accordance with claim 6, wherein when the on/off valve is open only the first area ($A_3$) can be subjected to the supply pressure downstream of the pilot orifice, so that a resulting differential pressure in the on/off valve is reduced because of the spring force acting on the control piston.

8. A hydraulic system in accordance with claim 6, wherein when the on/off valve is closing, the second area ($A_4$) of the control piston is first subjected to the resulting pressure in the on/off valve, so that the control piston is movable against the spring force acting on the control piston.

9. A hydraulic system in accordance claim 5, wherein the control piston of the hydraulic valve includes cylindrical sections to apply the control pressure to at least one control conduit.

10. A hydraulic system in accordance with claim 9, wherein a first cylindrical section and a second cylindrical section are provided on the control piston, and a middle section having a reduced outer diameter is positioned between the first cylindrical section and the second cylindrical section.

11. A hydraulic system in accordance with claim 10, wherein transitional areas between the first and second cylindrical sections and the middle section have a rounded shape.

12. A hydraulic system in accordance with claim 1, wherein the first area is an annular area that surrounds the second area at the common end face of the control piston.

13. A hydraulic system in accordance with claim 12, wherein the first area is inclined relative to a control piston longitudinal axis and the second area is substantially perpendicular to the control piston longitudinal axis.

14. A hydraulic system in accordance with claim 1, wherein the valve seat is carried by the proportional valve and includes an opening providing communication between the pilot orifice and a control pressure conduit when the control piston is moved away from the valve seat.

* * * * *